United States Patent
Froh et al.

(10) Patent No.: US 11,753,323 B2
(45) Date of Patent: Sep. 12, 2023

(54) IN-SITU REMEDIATION OF SULFATE CONTAMINATION

(71) Applicant: Commercial Liability Partners, LLC, Fenton, MO (US)

(72) Inventors: Ronald DuWayne Froh, Rio Grande, PR (US); Jesse Ronald Froh, Rio Grande, PR (US); Nizette Consolazio, Georgetown, PA (US); Eric R. Calderón-Ortiz, Cidra, PR (US); Alexander Krichevsky, St. Louis, MO (US)

(73) Assignee: COMMERCIAL LIABILITY PARTNERS, LLC, Fenton, MO (US)

( * ) Notice: Subject to any disclaimer, the term of this patent is extended or adjusted under 35 U.S.C. 154(b) by 0 days.

(21) Appl. No.: 17/385,483

(22) Filed: Jul. 26, 2021

(65) Prior Publication Data

US 2022/0033290 A1 Feb. 3, 2022

Related U.S. Application Data (60) Provisional application No. 63/145,796, filed on Feb. 4, 2021, provisional application No. 63/058,645, filed on Jul. 30, 2020.

(51) Int. Cl.
 *C02F 3/34* (2023.01)
 *C02F 3/28* (2023.01)
 *C02F 1/72* (2023.01)
 *C02F 1/68* (2023.01)
 (Continued)

(52) U.S. Cl.
 CPC ............. *C02F 3/345* (2013.01); *C02F 1/68* (2013.01); *C02F 1/722* (2013.01); *C02F 3/28* (2013.01);
 (Continued)

(58) Field of Classification Search
 None
 See application file for complete search history.

(56) References Cited

U.S. PATENT DOCUMENTS

| 5,554,290 A | 9/1996 | Suthersan |
| 6,143,177 A | 11/2000 | Suthersan |

(Continued)

FOREIGN PATENT DOCUMENTS

| KR | 20060081593 A | * | 1/2005 | |
| WO | WO-2019014061 A1 | * | 1/2019 | ............. A01N 37/46 |

OTHER PUBLICATIONS

Machine generated translation of KR 20060081593 A (Year: 2005).*

(Continued)

*Primary Examiner* — Magali P Slawski
*Assistant Examiner* — Bernadette Karen McGann
(74) *Attorney, Agent, or Firm* — GLOBAL PATENT GROUP INC.; Dennis Bennett; Ca Schlecht (57) ABSTRACT

The present disclosure provides an in-situ method for removing sulfates. The method comprises delivering at least one low molecular weight organic compound (LMWOC) to soil or groundwater to attain a concentration of the LMWOC of 750-3000 mg/L, such as 1000-2000 mg/L, or about 1500 mg/L, especially whereby sulfate is reduced to below 250 mg/L in the soil or groundwater. The method may further comprise contacting the soil or groundwater with an oxidizer, such as hydrogen peroxide, whereby the concentration of metals or metalloids is reduced in the soil or groundwater.

20 Claims, 8 Drawing Sheets

(51) Int. Cl.
  *C02F 101/10* (2006.01)
  *C02F 103/06* (2006.01)
  *C02F 103/34* (2006.01)
  *C02F 103/10* (2006.01)

(52) U.S. Cl.
  CPC .... *C02F 2101/101* (2013.01); *C02F 2103/06* (2013.01); *C02F 2103/10* (2013.01); *C02F 2103/34* (2013.01); *C02F 2209/06* (2013.01); *C02F 2209/22* (2013.01); *C02F 2305/023* (2013.01)

(56) References Cited

U.S. PATENT DOCUMENTS

| | | |
|---|---|---|
| 6,322,700 B1 | 11/2001 | Suthersan |
| 6,632,364 B1 | 10/2003 | Suthersan |
| 2015/0075776 A1* | 3/2015 | Adams ................ E21B 43/006 166/250.01 |

OTHER PUBLICATIONS

Miao, Z. et al., "Sulfate reduction in groundwater: characterization and applications for remediation", Environ Geochem Health, 34(4):539-50, (2012).

Paqell Company Website, Thiopaq O&G Process Description, found online at https://www.paqell.com/thiopaq/process-description/; retrieved on Oct. 28, 2021; 2 pages.

Reinsel, M., "Sulfate Removal Technologies: A Review", Water Online, 5 pages, (2015).

\* cited by examiner

IN-SITU REMEDIATION OF SULFATE CONTAMINATION

This application claims the benefit of priority of U.S. Provisional Patent Application Ser. No. 63/058,645 filed Jul. 30, 2020, and also claims the benefit of priority of the U.S. Provisional Patent Application Ser. No. 63/145,796 filed Feb. 4, 2021, the disclosures of which are each incorporated by reference in their entireties for all purposes.

This disclosure generally relates to removing contaminants, such as sulfates, metals, and metalloids, from soil or groundwater using low molecular weight organic compounds (LMWOC).

Many locations in the world have elevated sulfate concentrations in soil and groundwater because of human activity or natural processes. Sulfate contamination of soil and groundwater can pose certain environmental and public health challenges. The natural concentration of sulfate is typically between 50 and 100 mg/L. When the United States Environmental Protection Agency (EPA) designates sulfates as a secondary contaminant, the maximum suggested concentration limit is 250 mg/L in groundwater. If their levels reach 600 mg/L, sulfates can cause laxative and other undesirable health effects in humans and animals. Also, high sulfate concentrations can cause detrimental aesthetic effects with drinking water taste and odor. Hence, it is desirable to reduce sulfate concentrations in such locations below the recommended 250 mg/L. The sulfate concentration can be reduced to 0 mg/L (that is, to a level below the limit of detection).

Sulfate-reducing bacteria (SRB), and their respective substrates, have been extensively studied and described in the scientific literature for many decades. For instance, SRB precipitate heavy metals in soil. Sulfate remediation by in-situ lactate injection has been described. Ethanol has also been reported for use in reducing nitrate and sulfate concentrations. Several physical treatment technologies, such as reverse osmosis or ion exchange, have been known for treating sulfates. Those are typically not in-situ applications and do not involve sulfate-reducing bacteria or LMWOC. When treatment is not in-situ, groundwater must be pumped into aboveground bioreactors to treat and convert sulfates into elemental sulfur. How this treatment impacts other contaminants, such as heavy metals, is not known.

The prior art does not teach ranges of concentrations LMWOC needed to achieve the desired effect of sulfate removal in-situ. It also does not describe the combinations of substrates for sulfate reduction, nor that in-situ sulfate reduction on its own remove metals from groundwater. The experimental results disclosed herein contradict the widely accepted notions in the art, demonstrating the surprising SRB behavior we discovered. Namely, in-situ sulfate reduction increases metal concentrations rather than diminishing them. The claimed methods solve this problem.

SUMMARY

The present disclosure provides an in-situ method for removing sulfates. At least one low molecular weight organic compound (LMWOC) is delivered to soil or groundwater to attain a concentration of the LMWOC of 750-3000 mg/L in the soil or groundwater. Then, the soil or groundwater is contacted with an oxidizer.

In certain embodiments, the at least one LMWOC is delivered through an injection well, extending from the ground surface to soil or groundwater in a sulfate-containing zone, to attain a concentration of the LMWOC of 750-3000 mg/L in the sulfate-containing zone. In certain embodiments, the delivery uses an injection pumped into the ground. In certain embodiments, the delivery uses a direct push system. In certain embodiments, the delivery further comprises one or more sulfate-reducing bacteria species.

In certain embodiments, the delivery step comprises delivering a high molecular weight organic compound (HMWOC) and a population of microorganisms. The population of microorganisms ferments the HMWOC into the at least one LMWOC. In certain embodiments, the method further comprises delivering a high molecular weight organic compound (HMWOC) to create an anoxic or low redox condition favorable for sulfate-reducing bacteria. In certain embodiments, the LMWOC is delivered as a slurry, liquid, suspension, or solution.

In certain embodiments, the concentration of the LMWOC is 10 mg/L-10 g/L, such as 1-2 g/L, or 1.5 g/L. In certain embodiments, the at least one LMWOC is chosen from lactate, acetate, ethanol, butanol, or combinations thereof. In certain embodiments, two or more LMWOCs are delivered, such as a combination of lactate and acetate, for example, wherein the lactate comprises sodium lactate, and the acetate comprises sodium acetate. In certain embodiments, the at least one LMWOC is a combination of ethanol and butanol.

In certain embodiments, the oxidizer is hydrogen peroxide. In certain embodiments, the contacting step comprises adding the oxidizer until oxygenation reaches and stabilizes at about 3 mg/L as measured by a dissolved oxygen probe. In certain embodiments, the method further comprises adjusting the pH during the delivery step or the contacting step.

In certain embodiments, the sulfate is reduced to below 250 mg/L in the soil or groundwater. In certain embodiments, the concentration of metals or metalloids is reduced in the soil or groundwater. In certain embodiments, the sulfate is derived from coal combustion residuals. In certain embodiments, the soil or groundwater comprises industrial wastewater or mine runoff.

DETAILED DESCRIPTION

Sulfate-reducing bacteria (SRB) are anaerobic microorganisms that use sulfates as a terminal electron acceptor.

They are often ubiquitous in a variety of ecological niches. Typical organisms are bacteria and archaea; however, other organisms capable of sulfate reduction can be used instead for the embodiments of this disclosure. Exemplar SRB include, but are not limited to, *Desulfovibrio, Desulfobacterium, Desulfotomaculum, Desulfococcus, Archaeoglobus, Thermodesulfobacterium, Thermodesulfatator, Thermocladium, Desulfosporosinus, Desulfosporomusa, Desulfohalobium, Desulfocaldus, Desulfomicrobium, Desulfonatronovibrio, Desulfonatronum, Desulfomonile, Syntrophobacteraceae, Desulfarculus, Desulfobacteraceae, Desulfobulbaceae*, and *Desulfobacca* species.

During anaerobic respiration of SRB, or more broadly sulfate-reducing prokaryotes (SRPs), electrons are passed from the substrate to sulfate acceptor, wherein sulfate is typically reduced to hydrogen sulfide. In a sense, compared to aerobic life forms, SRB "breathe" sulfate rather than molecular oxygen, and reduce sulfate to sulfide, wherein oxygen is reduced to water during aerobic respiration. Notably, while most SRB are anaerobic, some species are relatively tolerant to oxygen, and some can even use it for metabolism. Generally, SRB are ubiquitous in anoxic habitats, where they have an important role in both sulfur and carbon cycles.

SRB use dissimilatory sulfate reduction, a process where sulfates are reduced to obtain energy, and the resulting sulfides are expelled as waste. SRB can be divided into organotrophs and lithotrophs. Organotrophs use organic compounds as substrates. Lithotrophs use molecular hydrogen as a substrate to oxidize. As electron acceptors, SRB are not limited to sulfates. In certain instances, they can reduce other types of sulfur compounds, including, but not limited to, sulfite, dithionite, thiosulfate, trithionate, and tetrathionate.

Sulfate-reducing bacteria can convert sulfate to hydrogen sulfide:

Electron donor(substrate)+$SO_4^{2-}$→$HCO_3^-$+$H_2S$

The electron donor and its concentration affect the success of this process. The typical electron donors or substrates for organotrophic SRB are low molecular weight organic compounds (LMWOC), including, but not limited to, organic acids and their salts (e.g., lactate, pyruvate, formate, malate fumarate, malate, and succinate); alcohols (e.g., ethanol, propanol, methanol, and butanol); volatile organic compounds (e.g., acetic acid or its salts); and other low molecular weight molecules, such as glycerol, glucose, amino acids, propionate, butyrate, valerate, caproate, benzene, toluene, ethylbenzene, and xylene. The other low molecular weight molecules are often fermentation products of other microorganisms within the ecosystem. At times, high molecular weight organic compounds (HMWOC)—such as molasses, oils, large molecular size hydrocarbons, protein, starch cellulose, and others—can be injected during soil or groundwater remediation. SRB cannot typically use these compounds until other microorganisms first ferment them to smaller-sized compounds.

The LMWOC can comprise a backbone of 1-6 carbon atoms, and more preferably 1-4 carbon atoms, and is often a hydrocarbon. In certain embodiments, the compounds are lactate and acetate, such as sodium lactate and sodium acetate.

Extensive prior art and conventional teachings suggest an additional benefit stemming from SRB activity. Hydrogen sulfide is produced, which converts dissolved metals to metal sulfides, thus precipitating them from groundwater. Bicarbonate is also produced, which increases the pH and precipitates metals as hydroxides. Metals and metalloids that might become insoluble either as sulfides or hydroxides include, but not limited to, arsenic, antimony, lead, barium, cadmium, zinc, manganese, chromium, cobalt, copper, iron, and nickel, among others, including metals that may cause potentially detrimental health effects.

In the prior art, sulfide ions were produced via sulfate reduction by SRB. The sulfide ions then reacted with metals and metalloids dissolved in groundwater, including harmful heavy metals, to form a precipitate, which the soil matrix eventually filtered out. One example is pyrite, known as "fool's gold," with the chemical formula of $FeS_2$, which can form by the reaction between iron and sulfide ions. Another example of a natural mineral formed by sulfide ions is realgar, a precipitate of arsenic having the chemical formula $As_2S_3$. Another is galena (PbS), a precipitate of lead. Hence, sulfide ions generate many naturally occurring minerals of heavy metals, which otherwise would be dissolved, harmful ions in groundwater.

Figure 1:
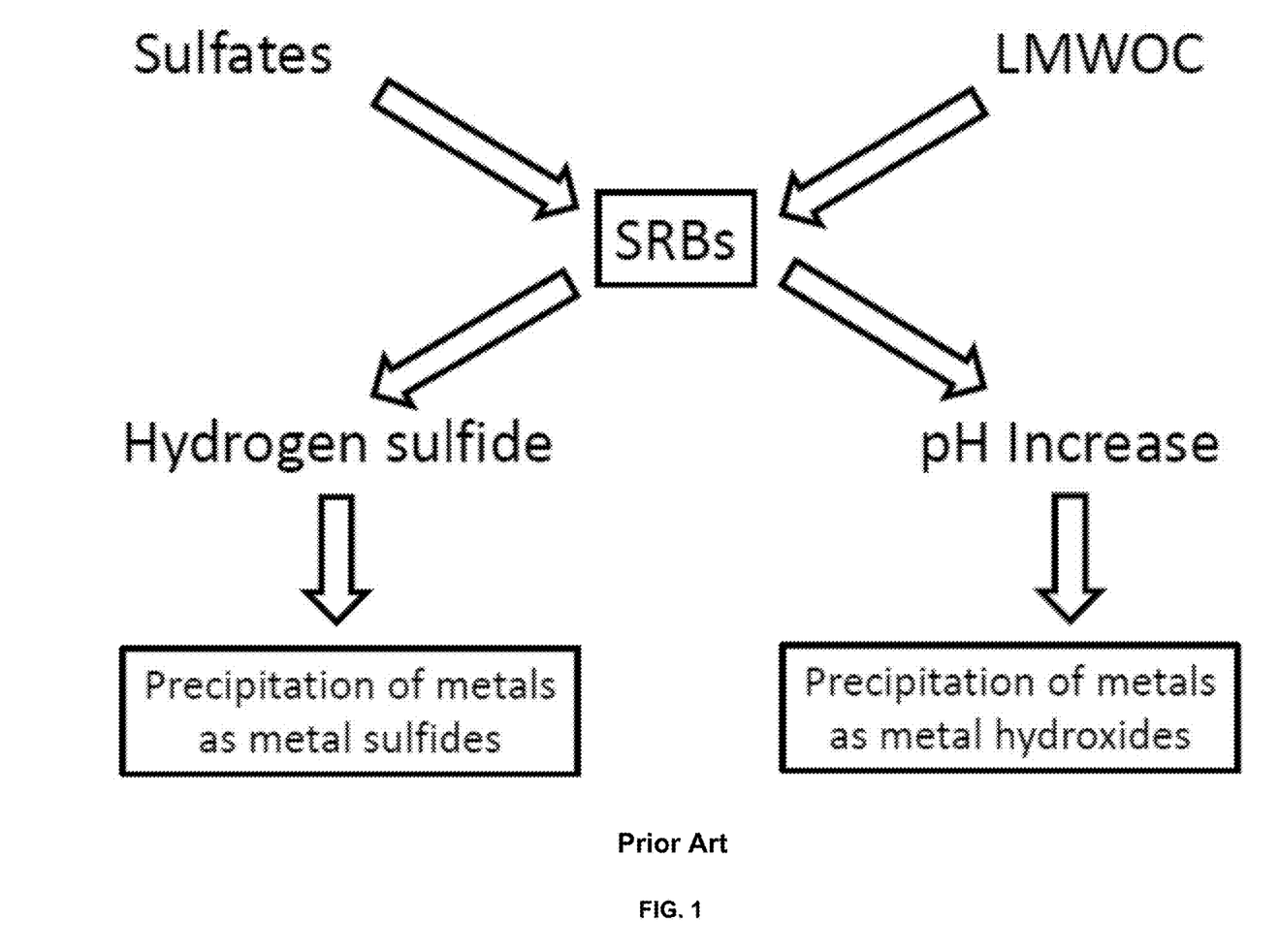
FIG. 1 depicts the conventional and prior art understanding of sulfate reduction and its influence on metal solubility.

Also, purportedly, bicarbonate ions produced during sulfate reduction increased the pH and, thus, increased the concentration of hydroxide ions, which also drove precipitation of certain metals and metalloid as insoluble hydroxides. For instance, three valent chromium forms an insoluble $Cr(OH)_3$ precipitate, removing harmful $Cr^{3+}$ ions from groundwater. Major chemical processes and mechanisms summarizing this commonly accepted prior art are schematically shown in FIG. 1.

Figure 2:
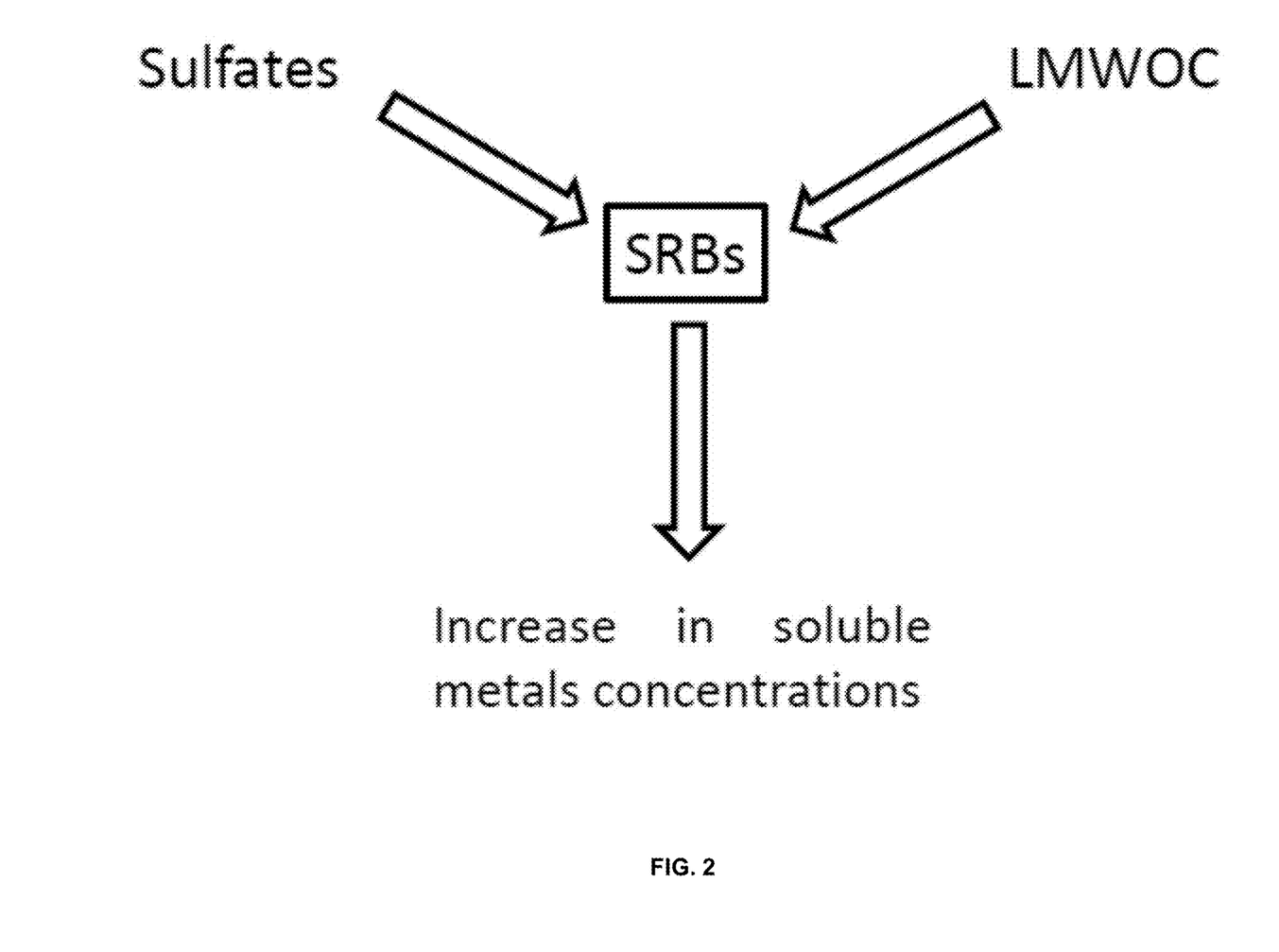
FIG. 2 depicts the impact of sulfate reduction on metal solubility factually observed in the experiments disclosed herein.

However, disclosed herein are experimental results regarding the behavior of soluble metals after LMWOC treatment and sulfate reduction. While the conventional wisdom and prior art unanimously taught that metal concentrations in samples treated for sulfate reduction decreased from the precipitation of metal and metalloid as sulfides and hydroxides, an opposite effect was seen. Large increases in various metals concentrations after sulfate reduction in treated soil and groundwater samples, including, but not limited to, barium, manganese, iron, and magnesium. The experimentally observed impact of sulfate reduction on soluble metal concentrations is shown in FIG. 2.

Figure 3:
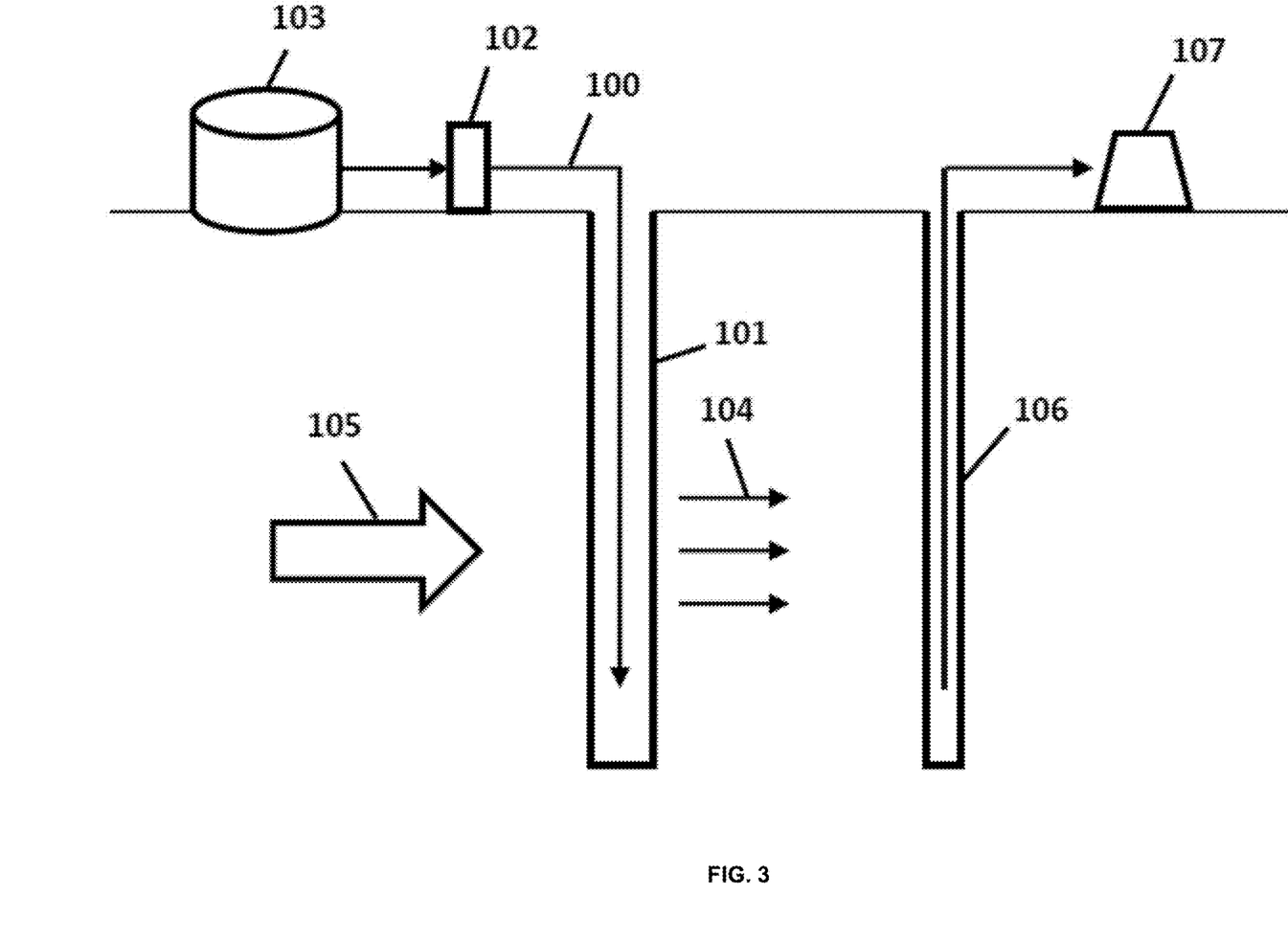
FIG. 3 is a schematic sectional view of the injection facility.

The methods of reagent and substrate delivery during the environmental remediation process are well known in the art. An exemplar injection facility for subsurface delivery is shown in FIG. 3. A reagent stream 100 comprising LMWOC can be injected under pressure into the subsurface through the injection well 101, creating a reactive zone where SRB can use both preexisting sulfate on-site and the injected substrate. Several injection devices can be used, including direct push systems. A mixing pump 102 may be used to provide a more homogeneous mixture and to saturate the subsurface to a final concentration of the LMWOC between about 0.1-100 mM, such as between about 1-10 mM, between about 15 mg/L-15 g/L, or between about 150-1,500 mg/L.

A metering pump can be optionally attached in communication with the injection wells. A reagent stock solution may be held in a holding tank 103. The injected mixture passes through the fluid-permeable screen positioned within the injection well and mixes with the surrounding groundwater or directly flows through the soil. The injected substrate 104 typically follows the flow of the groundwater stream 105. A monitoring well 106, and optionally monitoring equipment 107, may be positioned downgrade from the injection well to follow up on injection results. The injected LMWOC can be introduced as a solution or a slurry or using other forms of mixtures known in the art. This same injection method can introduce other agents into the subsurface, including, but not limited to, additional exogenous SRB, oxidizing agents, and other compounds. Other delivery methods may be used, including, but not limited to, mixing compounds or agents into target soil or adding those directly into the contaminated water stream, such as industrial wastewater, mine runoff, or another medium requiring treatment.

The present disclosure provides an additional step of reducing metal concentrations after reducing sulfate. Specifically, treatment with an oxidizer, such as hydrogen peroxide, allows the soluble metal concentrations to return to their native background levels. Furthermore, pH adjustment may help oxidizer be more effective, eventually returning metal concentrations to the background levels.

In one embodiment, a final concentration of LMWOC achieved in soil or groundwater the ranges between about 0.1-100 mM, such as between about 1-10 mM, about between 15 mg/L-15 g/L, or between about 150-1,500 mg/L, wherein the LMWOC is delivered into the subsurface or groundwater, such as via injection.

In another embodiment, a combination of LMWOC is used for sulfate remediation, wherein the combination comprises two or more types of LMWOCs. For example, the combination comprises lactate and acetate.

In yet another embodiment, the first step is sulfate reduction. The second step reduces the soluble metal concentrations in soil or groundwater. In one embodiment, an oxidizer, for example, hydrogen peroxide, is added after sulfate remediation with LMWOC is completed to reduce concentrations of soluble metals, which might have been elevated due to in-situ sulfate reduction. The oxidizer and LMWOC may be accompanied by pH adjustment to achieve the desired effect.

In another embodiment, LMWOC is augmented by adding cultured SRB, delivered into soil or groundwater to enhance indigenous SRB's activity or provide an SRB source where indigenous SRB species are absent. Particularly, adding exogenous SRB can be particularly useful after oxidizer treatment, which annihilates local SRB populations. If additional sulfate reduction is desired, exogenous SRB must be provided.

Furthermore, microorganisms that can enhance SRB activity or improve SRB performance might be co-delivered, for instance, organisms capable of fermenting long-chain hydrocarbons into LMWOC, which can be used by SRB. As a further example, yeast can be delivered with various sugars or other high molecular weight organic compounds (HMWOC), which SRB cannot typically use directly, resulting in in-situ fermentation of the HMWOC and generation of LMWOC, such as ethanol, which the SRB can use directly.

In another embodiment, the remediation site is initially injected with HMWOC, used as substrates by various microorganisms at the site (typically non-SRB) and promoting deoxygenation and decreased redox potential of the site. This process creates site conditions favorable for SRB activity, namely an anoxic environment and a low redox potential below −50 mV, such as below −250 mV or −500 mV. Then, LMWOC is delivered into the environment prepared for enhanced SRB activity.

The present disclosure may be practiced using single or multiple deliveries spread over time and single or multiple wells. In certain embodiments, multiple wells and multiple deliveries are performed. The performance generally depends on the level of sulfate contamination, local geology, hydrogeology, soil properties, and other parameters specific to a given site. Other compound or agent delivery methods include pump-and-treat at the location, permeable reactive barriers, and other suitable delivery methods known in the art.

In another embodiment, a mixture of two or more LMWOC is used. For instance, a mixture of lactate and acetate, or ethanol and butanol, are delivered. In certain embodiments, the mixture comprised lactate and acetate, such as sodium lactate and sodium acetate.

In yet another embodiment, a cultured SRB can be co-injected or otherwise co-delivered with the substrate to augment or enhance the indigenous SRB species' activity. The delivery of exogenous or additional SRB is valuable when sulfate is reduced after oxidizer use. An oxidizer typically extinguishes local SRB populations, which may take a long time to recover. For example, delivering exogenous SRB from another location or cultured in a laboratory to replace the extinct population can timely reduce additional sulfate.

Other microorganisms or compounds capable of enhancing SRB activity might be co-injected or co-delivered into the contaminated zone. For example, organisms capable of fermenting long-chain hydrocarbons into fermentation products that SRB can use can be injected. For instance, yeast can be injected with various sugars or other long-chain hydrocarbons, fermenting in-situ, and generating LMWOC, such as ethanol, which SRB can use directly. Examples of HMWOC, for the most part, are hydrocarbons and sugars. These include, but not limited, to molasses, corn syrup, whey cheese, milk curd, cheese, fat, sugar, fruit juice, vegetable juice, starch, cornstarch, vegetable oil, vegetable extracts, sugarcane bagasse, leaf mulch, mushroom compost, fruit wastes, sawdust, vegetal compost, wine industry wastes, and other materials. Also, delivering HMWOC can help reduce the concentration of oxygen and redox potential and promote SRB effectiveness.

In yet another embodiment, where no or insufficient indigenous SRB populations exist either due to nature or humans, such as oxidizers use, SRB can be co-injected or otherwise co-delivered with the substrates. Particularly, low pH environments may have reduced or no indigenous SRB populations. In this case, co-delivery of SRB species capable of functioning at low pH would be desirable. For instance, certain *Desulfovibrio*, *Desulfotomaculum*, *Desulfitobacterium*, and *Desulfosporosinus* strains remain viable at a relatively low pH. Co-delivery can occur simultaneously; i.e., substrate and microorganism can be mixed and delivered together or separately with either microorganism or substrate being injected first.

Although unlikely to happen while practicing the present disclosure, if hydrogen sulfide is produced in large volumes, it can pose health and environmental risks, including corrosion. Thus, precautions should be taken to avoid accumulating hydrogen sulfide. Similarly, rapid pH fluctuations might cause detrimental health, environmental effects, and SRB effectiveness. Thus, pH levels should also be monitored.

EXAMPLES

Example 1—Test Site Characterization

An industrial location with a history of high sulfate concentration in soil and groundwater was selected. To confirm high levels of sulfate contamination, baseline groundwater samples were analyzed at several monitoring wells. A third-party laboratory completed the baseline analysis of sulfate, total organic carbon (TOC), and the twelve groundwater monitoring program metals and metalloids shown in Table 1.

TABLE 1

Baseline Groundwater Samples Characterization Methods, Maximum Contaminant Levels (MCL), and Detection Limits

| Constituent | MCL | Method Detection Limit |
|---|---|---|
| Method 9056A | | |
| Sulfate | 250 mg/L | 0.348 mg/L |
| Method 6020A | | |
| Arsenic | 10 µg/L | 0.750 µg/L |
| Barium | 2,000 µg/L | 2.23 µg/L |
| Cadmium | 5 µg/L | 0.197 µg/L |
| Calcium | — | 583 µg/L |
| Chromium | 100 µg/L | 0.980 µg/L |
| Iron | 300 µg/L | 47.0 µg/L |
| Lead | 15 µg/L | 0.450 µg/L |
| Magnesium | — | 199 µg/L |
| Manganese | 50 µg/L | 2.06 µg/L |
| Potassium | — | 216 µg/L |
| Selenium | 50 µg/L | 0.890 µg/L |
| Sodium | — | 329 µg/L |
| Method 5310C | | |
| Total Organic Carbon (TOC) | — | 141 µg/L |

The tested samples had a high sulfate concentration. The typical sulfate levels in this location ranged between 500-1,000 mg/L and, more frequently, between 600-800 mg/L.

Example 2—Experimental Setup

Following the initial test site characterization described in Example 1, a drilling contractor collected soil and groundwater samples for further study. Due to local geology specifics, the samples contained sections of sand and silty clay, which were treated separately to determine remediation effects in those matrices, further referred to as sand samples and clay samples. All collected materials were immediately sealed. The collection containers were filled to exclude air and prevent sample oxidation or change redox potential.

The following microcosms were set up per Table 2: (1) soil and groundwater with LMWOC amendment, including lactate/acetate (comprising sodium lactate and sodium acetate) or ethanol/butanol (comprising ethanol and butanol), as described below and (2) control samples with soil and groundwater only (no added LMWOC). Two types of soil, sand and clay, were incorporated into the experimental design: (1) sand and gravel from the alluvial aquifer (sand samples) and (2) silty clay from the confining unit overlying the sand and gravel aquifer (clay samples). The microcosms were set up using laboratory-grade 250 mL plastic bottles with screw-top caps, sealed with Parafilm™ to delay oxygen entry. Soils were screened to remove particles greater than 10 mm in diameter and homogenized. Each 250-mL microcosm comprised 180 g (about 120 mL) of the relevant soil type. The remaining volume in the bottle (about 170 mL to account for voids in the soil) was filled with groundwater (amended with the substrates or not, in the case of the control samples).

TABLE 2

Microcosms Setup

| Microcosm Type | Mass of Soil (g) | Volume of Groundwater (mL) | Final Substrate Concentration (mg/L) |
|---|---|---|---|
| Silty Clay/Groundwater Control (No Substrate) | 180 | 170 | 0 mg/L |
| Sand/Groundwater Control (No Substrate) | 180 | 170 | 0 mg/L |
| Mixture of Sodium Lactate and Sodium Acetate (lactate/acetate) for Each Soil Type | 180 | 170 | 1,500 mg/L (10 mM of each compound) |
| Mixture of Ethanol and Butanol (ethanol/butanol) for Each Soil Type | 180 | 170 | 410 mg/L (5 mM of ethanol and 2.5 mM of butanol) |

For lactate/acetate, the final substrate concentration refers specifically to lactate and acetate ionic concentrations, not the sodium salts. Because other lactate and acetate salts might be employed, a baseline concentration of the active compounds was measured. For the lactate/acetate combo, the microcosms' final concentrations were designed to contain 10 mM of each component, with about 900 mg/L lactate and about 600 mg/L acetate, resulting in about 1,500 mg/L of total substrate materials. Ethanol/butanol combo was prepared similarly. The final concentration of ethanol and butanol in the microcosms were 5 mM and 2.5 mM, respectively, or about 227 mg/L ethanol and about 185 mg/L butanol, resulting in about 410 mg/L total substrate concentration.

Several of each microcosm were prepared for testing over 30-day intervals. The initial sulfate concentration, about 620 mg/mL, was similar across microcosms since they were all derived from the same drilled cores. For the study's duration, the microcosms were gently shaken about once a week to ensure adequate contact between the aqueous and solid phases. Samples were held at an approximate ambient subsurface temperature of between 12-18° C.

Example 3—Sulfate Reduction

Figure 4:
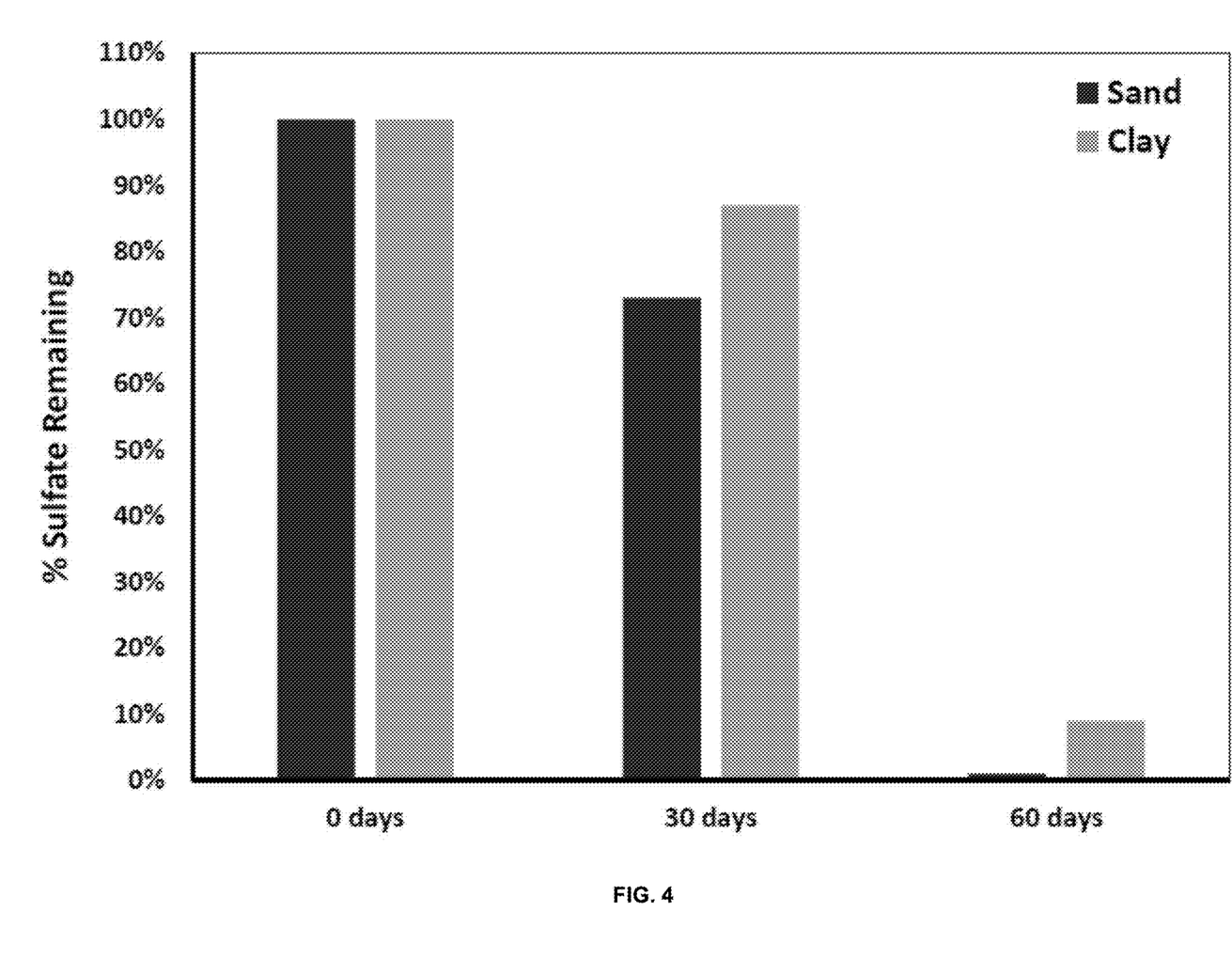
FIG. 4 depicts sulfate reduction over 60 days using a combination of lactate and acetate substrates.
Figure 5:
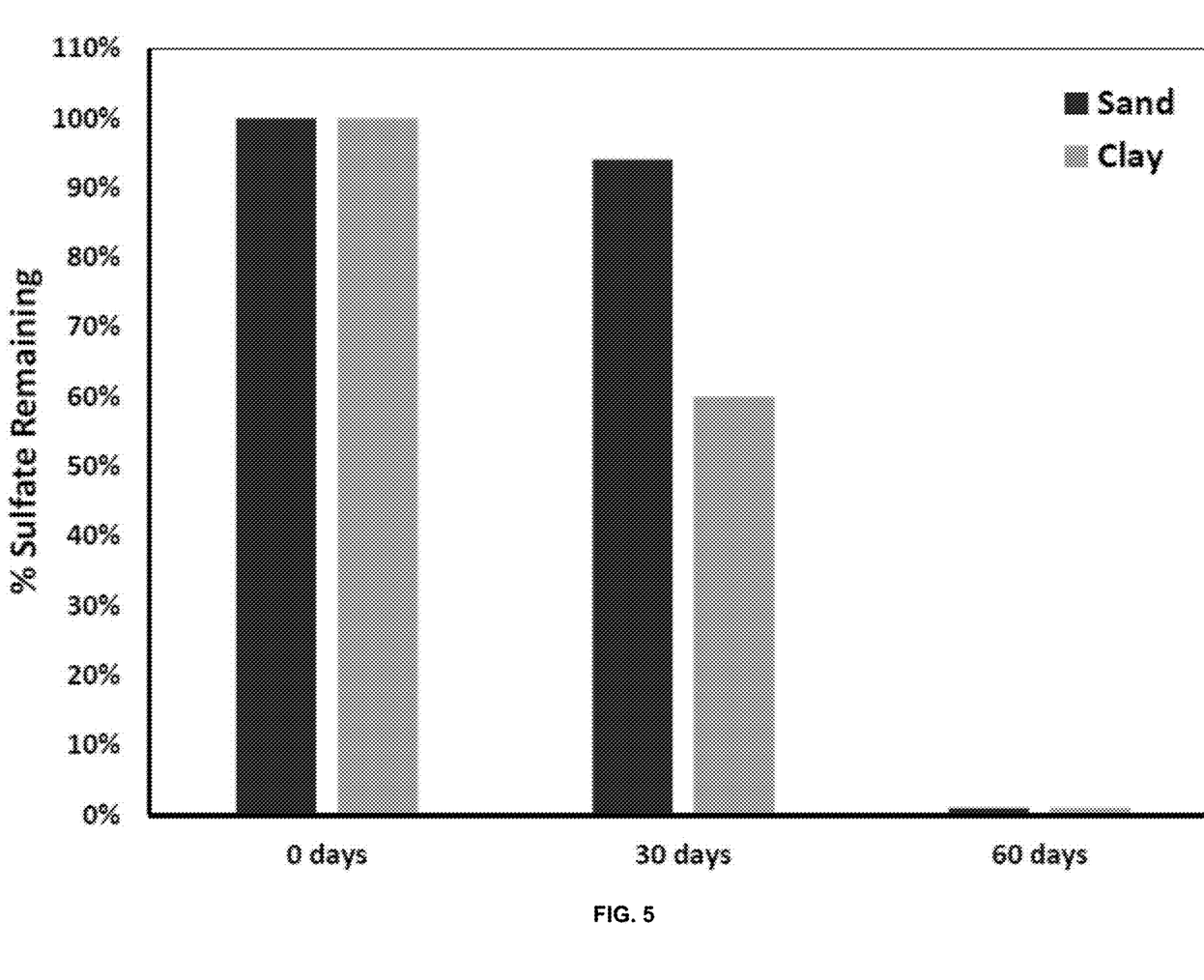
FIG. 5 depicts sulfate reduction over 60 days using a combination of ethanol and butanol substrates.

The results from sulfate reduction in microcosms treated with lactate/acetate and ethanol/butanol mixtures are shown in FIGS. 4 and 5, respectively. As FIG. 4 demonstrates, after about 60 days of incubation with lactate/acetate, sulfates were essentially eliminated from the microcosms. A low concentration of sulfates (about 9% of the original amount) remained in the silty clay sample treated with lactate/acetate. The remaining about 53 mg/mL was significantly below the MCL limit of 250 mg/mL and even lower than the natural sulfate concentration typical to this country's region, estimated to be around 60-80 mg/mL. Hence the remediation goals were achieved in their entirety.

The ethanol/butanol combination showed slightly superior results, as shown in FIG. 5. It worked at lower concentrations than lactate/acetate, virtually eliminating sulfate in both sand and clay samples. Ethanol and butanol, however, are likely not practical in the field due to high flammability and dangers in handling. The lactate/acetate combination was comparable, differing from ethanol/butanol only by a few percentage points in the clay sample. Lactate and acetate, two food-grade compounds, are non-toxic and non-flammable and, thus, are more practical.

To summarize FIGS. 4 and 5, the reduction in sulfate concentrations after the first 30 days was relatively modest compared to 60 days. This effect is likely because the initial amount of SRB in the soil is not very high. It takes some time for the microbial population to proliferate. A growth lag in the SRB population is likely before it enters the logarithmic growth phase, contributing to the time lag between LMWOC application and complete sulfate removal. Once logarithmic SRB population growth commenced, the exponential increase in SRB numbers allows faster and more robust use of both substrates and sulfates, leading to a drastic reduction in sulfate concentration in the second month of the experiment.

Example 4—Treatment Increases Metal Concentrations

Experimental results were obtained for soluble metals after LMWOC treatment. Conventional wisdom and prior art taught that metal concentrations in samples treated for sulfate reduction should decrease due to forming metal sulfides and hydroxides (see FIG. 1). Our experimental results showed otherwise. The concentrations of various metals increase very strongly in the LMWOC treated samples, including, but not limited to, barium, manganese, iron, and magnesium.

Figure 6:
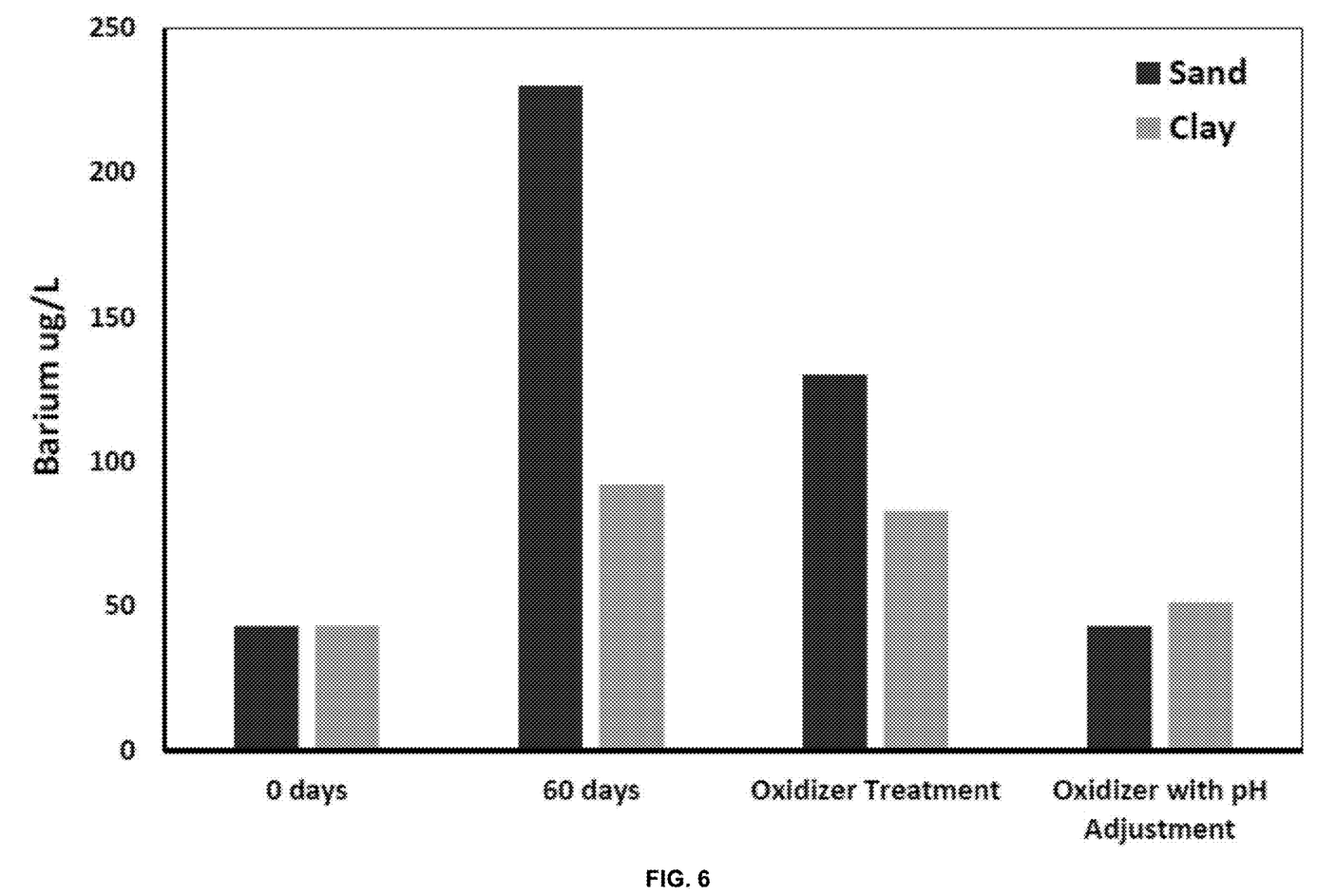
FIG. 6 depicts the barium concentrations, which elevated in experimental microcosms after 60 days of LMWOC treatment and were reduced to pretreatment levels with oxidizer and pH adjustment.
Figure 7:
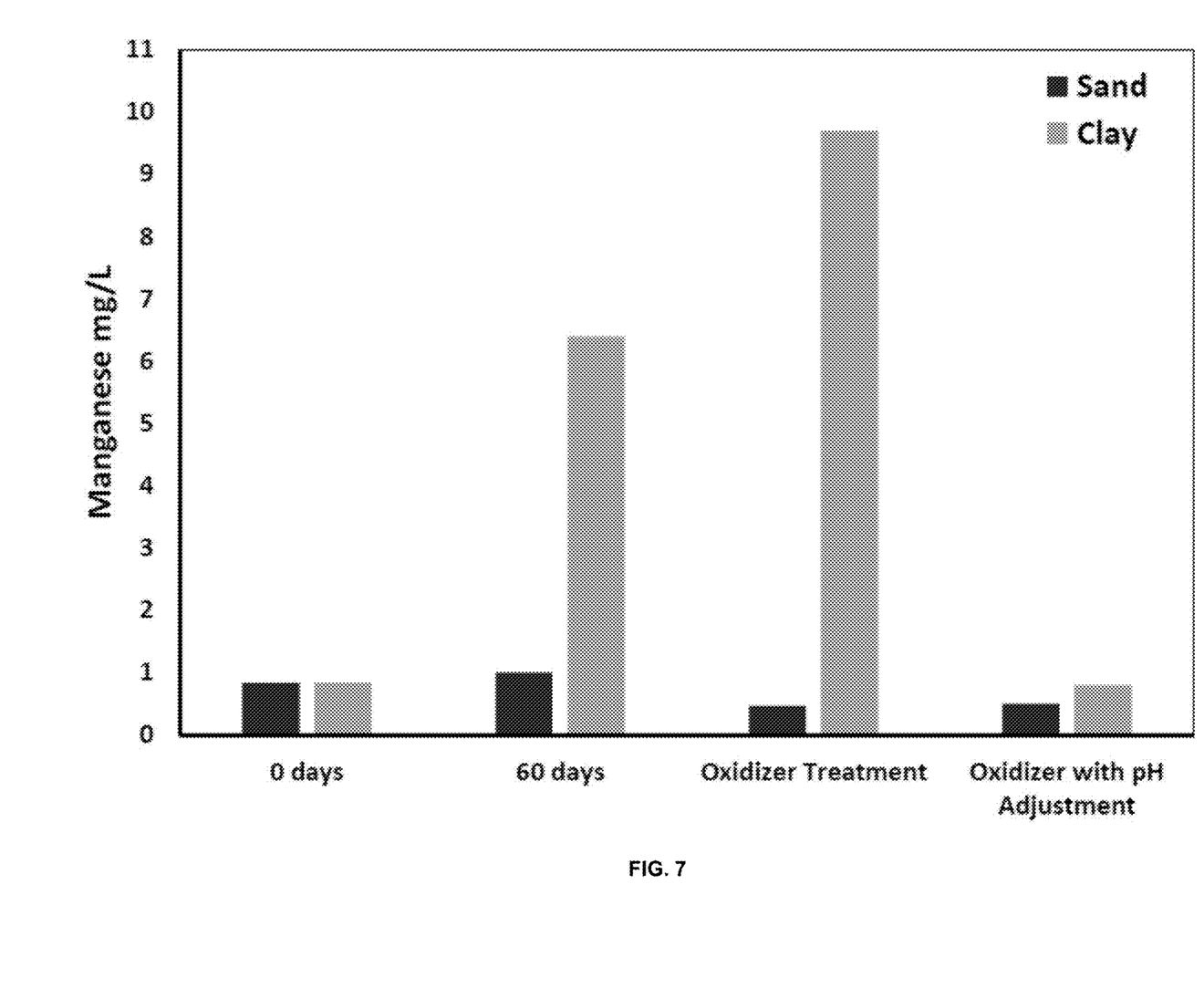
FIG. 7 depicts manganese concentrations elevated in experimental microcosms after 60 days of LMWOC treatment and were reduced to pretreatment levels with oxidizer and pH adjustment.

FIGS. 6 and 7 show barium and manganese results from the samples incubated for 60 days with a lactate/acetate. FIG. 6 shows changes in barium concentrations throughout the lactate/acetate treatment. After 60 days, a several-fold increase in barium concentrations occurred in both the sand and clay samples, with the concentration rise more pronounced in the clay samples. While these elevated concentrations are still significantly lower than the recommended barium MCL of 2 mg/L, it is still of great environmental benefit to reduce barium levels closer to the naturally-occurring initial experimental concentrations at about 40 µg/L. We have attempted the reduction of metals using an oxidizer, namely hydrogen peroxide ($H_2O_2$).

Initial oxidation experiments were carried out at a pH of 6.8-7.4. Hydrogen peroxide stock solution of 3% was diluted, directly before the application, to about 0.3% and 0.05%. Working solutions were titrated, using few milliliter increments, into the microcosm samples. The titration started with 0.05% solution, slowly increasing oxygenation levels, followed by titration of higher concentration hydrogen peroxide of 0.3%. Clay samples were additionally titrated with 3% hydrogen peroxide until the sample oxygenation reached and stabilized at 3 mg/L per dissolved oxygen (DO) probe. At that point, the samples were considered fully oxidized. The oxygenation titration was performed within 30-60 minutes. Samples were analyzed for metal concentrations within a few days after titration.

Hydrogen peroxide titration very significantly reduced the soluble barium concentration. See FIG. 6, the column entitled "oxidizer treatment." Barium levels remained somewhat higher than the initial background concentrations. A further reduction of soluble barium is desirable.

To this end, the oxidation experiment was repeated at higher alkalinity of pH at 8.0-8.3. The samples were first normalized to the higher pH of 8.0-8.3, using 1M NaOH (aq), followed by the hydrogen peroxide titration process described above. Sodium hydroxide was also co-titrated with hydrogen peroxide as needed to maintain the pH at 8.0-8.3 and prevent the increase in acidity from metal hydroxide precipitation. Sample oxidation at higher pH caused further barium precipitation, with its concentrations returning to initial background ranges.

Results for manganese concentrations are shown in FIG. 7. Notably, for manganese, sulfate reduction and application of LMWOC did not significantly affect manganese levels in the sand samples but significantly increased soluble manganese in the clay sample. Furthermore, oxidizer treatment at a lower pH of 6.8-7.4 did not remedy the problem. A pH increase to 8.0-8.3 caused manganese levels to drop back to their original background levels.

These results demonstrated an unusual phenomenon in environmental remediation. The common wisdom and prior art teach us that a beneficial side effect of sulfate reduction is decreased soluble metal concentrations resulting from the precipitation of metals as sulfides and hydroxides. The disclosed experiments demonstrate otherwise. To overcome this unexpected challenge, the second step uses an oxidizer, optionally including pH adjustment. The method disclosed herein reduces soluble metal concentrations to the background levels.

In addition to removing metals and metalloids, oxidation is likely to eliminate or significantly reduce SRB populations. Thus, it should be carried out after sulfate remediation once sulfate concentrations have reached the desired levels. If more sulfate needs to be removed later, then exogenous SRB must be introduced before, during, or immediately after LMWOC administration.

Example 5—LMWOC Concentrations for Sulfate Reduction

To determine the LMWOC concentrations suitable for sulfate reduction, lactate/acetate was titrated by exposing microcosms to different concentrations over 120 days. Concentrations have been tested of 750 mg/L, 1,500 mg/L and 3,000 mg/L of total LMWOC added 5 mM, 10 mM and 20 mM of each substrate, respectively.

Figure 8:
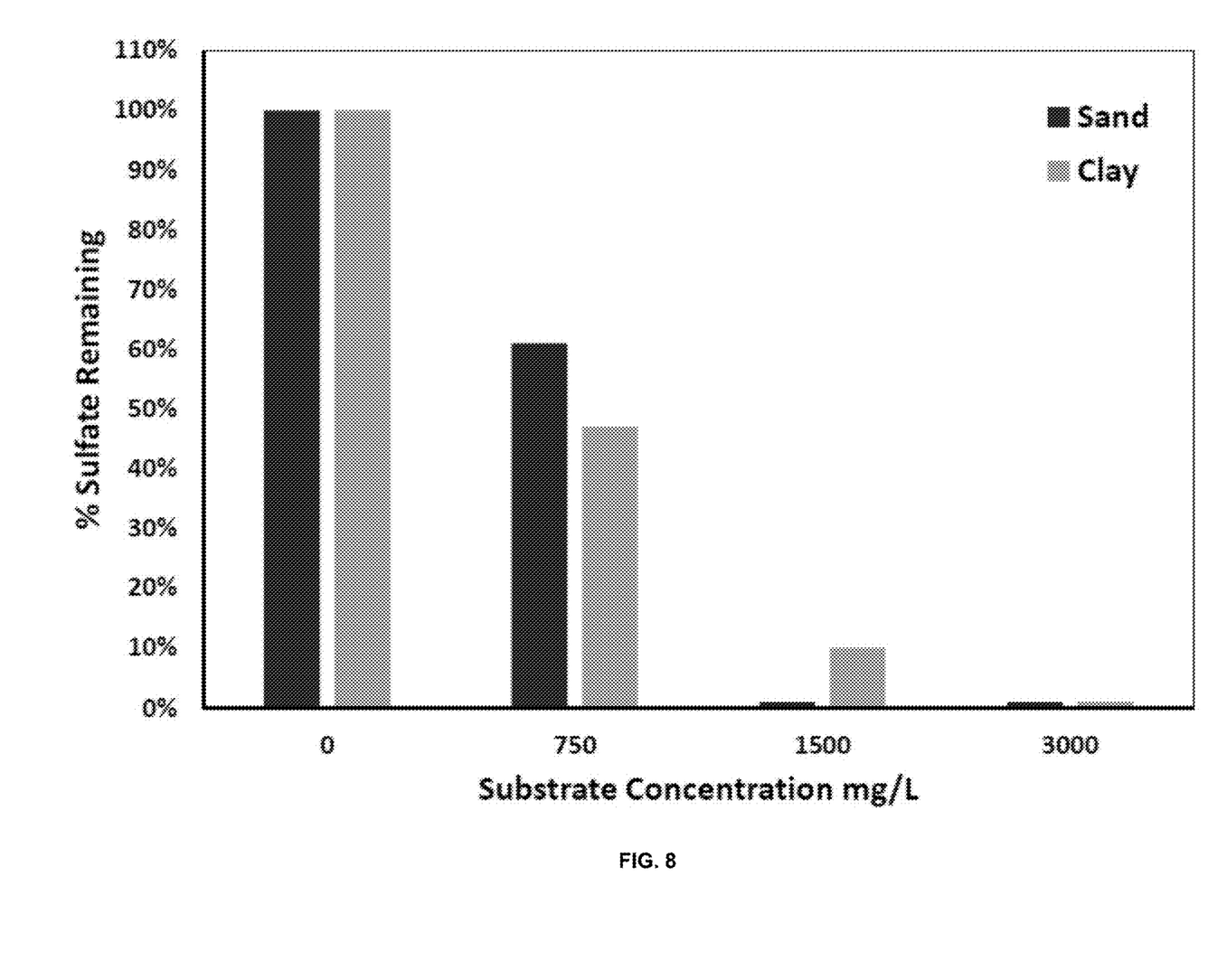
FIG. 8 depicts the LMWOC substrate concentrations range.

FIG. 8 shows that lactate/acetate with a total LMWOC concentration of 1,500 mg/L (10 mM of each substrate) balanced cost, single delivery, and remediation time of about two months. After four months of incubation of the microcosms with the same substrate, the remaining sulfate was very similar to that found in samples after only two months, suggesting that most, if not all, of the LMWOC was depleted. Further sulfate reduction is not likely to occur unless more substrate was delivered into the samples. However, this concentration has reached the goal of sulfate reduction to the desired levels.

As further shown in FIG. 8, lower total LMWOC concentrations of 750 mg/L (comprising 5 mM of each substrate) failed to sufficiently remediate sulfate contamination. In these samples, over 50% of the sulfate remained after 4 months. By this time, the organic substrate likely depleted. No further sulfates were reduced. Even if the process continued, a significantly long time was needed to reduce any more sulfate. Alternatively, further reduction may require more substrate, which significantly increases remediation cost. For these reasons, concentrations lower than 1,500 mg/L were less effective.

A higher concentration of total LMWOC of 3,000 mg/L (20 mM of each substrate) shows similar or somewhat superior results than 1,500 mg/L. The sulfate was completely removed after the 4-month incubation. Yet this method is more expensive because of the increased cost of substrate materials as compared to the use of 1,500 mg/L.

The target concentration may fluctuate depending on site geology, sulfate concentration, contamination, availability of other organic substrates existing in the soil, and other conditions. In some locations, the remediation can be longer or shorter than the 2 months. The concentration may vary from substrate to substrate, for example, 10 mM for lactate/acetate and 5 mM/2.5 mM for ethanol/butanol combinations. The concentration range for various LMWOCs is 0.1-100 mM, such as 1-10 mM, 15 mg/L-15 g/L, or 150-1,500 mg/L.

The preceding description is given for clearness of understanding only. No unnecessary limitations should be understood, as modifications within the disclosure's scope may be apparent to those having ordinary skill in the art. Throughout the specification, where compositions are described as including components or materials, it is contemplated that the compositions can also consist essentially of, or consist of, any combination of the recited components or materials, unless described otherwise. Likewise, where methods are described as including steps, it is contemplated that the methods can also consist essentially of, or consist of, any combination of the recited steps, unless described otherwise. The disclosure illustratively disclosed herein suitably may be practiced in the absence of any element or step which is not specifically disclosed herein.

The practice of a method disclosed herein, and individual steps thereof, can be performed manually and/or with the aid of or automation provided by electronic equipment. Although processes have been described concerning embodiments, a person of ordinary skill in the art will readily appreciate that other ways of performing the methods' acts may be used. For example, the order of various of the steps may be changed without departing from the method's scope or spirit unless described otherwise. Some of the individual steps can also be combined, omitted, or further subdivided into additional steps.

It is appreciated that certain features of the invention, which are, for clarity, described in the context of separate embodiments, may also be provided in combination in a single embodiment.

Conversely, various features of the invention, which are, for brevity, described in the context of a single embodiment, may also be provided separately or in any suitable subcombination. All combinations of the embodiments about the chemical groups represented by the variables contained within the generic chemical formulae described herein are specifically embraced by the present invention just as if each combination was individually explicitly recited, to the extent that such combinations embrace stable compounds (i.e., compounds that can be isolated, characterized, and tested for biological activity). Also, all subcombinations of the chemical groups listed in the embodiments describing such variables, as well as all subcombinations of uses and medical indications described herein, are specifically embraced by the present invention just as if each subcombination of chemical groups and subcombination of uses and medical indications was individually and explicitly recited herein.

All patents, publications, and references cited herein are fully incorporated by reference. In case of conflict between the present disclosure and incorporated patents, publications, and references, the present disclosure should control.

The invention claimed is:

1. An in-situ method for removing sulfates, comprising:
   delivering at least one low molecular weight organic compound (LMWOC) to soil or groundwater containing one or more sulfate-reducing bacteria species to attain a concentration of the LMWOC of 750-3000 mg/L in the soil or groundwater, wherein the at least one LMWOC is chosen from lactate, acetate, ethanol, butanol, or combinations thereof; and
   contacting the soil or groundwater with an oxidizer, wherein the contacting step comprises adding the oxidizer until oxygenation reaches and stabilizes at about 3 mg/L as measured by a dissolved oxygen probe; and
   whereby sulfates are removed in situ.

2. The in-situ method of claim 1, wherein the at least one LMWOC is delivered through an injection well, extending from the ground surface to the soil or groundwater in a sulfate-containing zone in the ground, to attain a concentration of the LMWOC of 750-3000 mg/L in the sulfate-containing zone.

3. The in-situ method of claim 1, wherein the delivering step uses an injection pumped into the ground.

4. The in-situ method of claim 1, wherein the delivering step uses a direct push system.

5. The in-situ method of claim 1, wherein the delivering step further comprises delivering a high molecular weight organic compound (HMWOC) and a population of microorganisms, wherein the population of microorganisms ferments the HMWOC into the at least one LMWOC.

6. The in-situ method of claim 1, further comprising delivering a high molecular weight organic compound (HMWOC) to create an anoxic or low redox condition favorable for the one or more sulfate-reducing bacteria species.

7. The in-situ method of claim 1, wherein the LMWOC is delivered as a slurry, liquid, suspension, or solution.

8. The in-situ method of claim 1, wherein the concentration of the LMWOC is 1-2 g/L.

9. The in-situ method of claim 8, wherein the concentration of the LMWOC is about 1.5 g/L.

10. The in-situ method of claim 1, wherein two or more LMWOCs are delivered.

11. The in-situ method of claim 1, wherein the at least one LMWOC is a combination of lactate and acetate.

12. The in-situ method of claim 11, wherein the lactate comprises sodium lactate, and the acetate comprises sodium acetate.

13. The in-situ method of claim 1, wherein the at least one LMWOC is a combination of ethanol and butanol.

14. The in-situ method of claim 1, wherein the oxidizer is a peroxide.

15. The in-situ method of claim 1, further comprising adjusting the pH during the delivering step or the contacting step.

16. The in-situ method of claim 1, whereby sulfate is reduced to below 250 mg/L in the soil or groundwater.

17. The in-situ method of claim 1, whereby the concentration of metals or metalloids is reduced in the soil or groundwater.

18. The in-situ method of claim 1, wherein the sulfate is derived from coal combustion residuals.

19. The in-situ method of claim 1, wherein the soil or groundwater comprises industrial wastewater or mine run-off.

20. The in-situ method of claim 14, wherein the oxidizer is hydrogen peroxide.

* * * * *